United States Patent [19]

Sirabella

[11] Patent Number: 5,015,871

[45] Date of Patent: May 14, 1991

[54] MULTIPLE EXTERNAL ASYNCHRONOUS TRIGGERS CIRCUIT

[75] Inventor: Joseph Sirabella, Massapequa, N.Y.

[73] Assignee: Harris Corporation, Melbourne, Fla.

[21] Appl. No.: 431,305

[22] Filed: Nov. 3, 1989

[51] Int. Cl.⁵ .................................................. H03K 1/17
[52] U.S. Cl. ..................................... 307/269; 307/480;
   307/481; 307/591; 307/594; 307/272.3;
   307/465; 307/527; 375/106; 375/107; 328/63
[58] Field of Search ............... 307/480, 481, 591, 594,
   307/272.3, 465, 269, 527; 375/106, 107; 328/63

[56] References Cited

U.S. PATENT DOCUMENTS

| | | | |
|---|---|---|---|
| 4,241,418 | 12/1980 | Stanley | 307/480 |
| 4,320,515 | 3/1982 | Burton, Jr. | 307/269 |
| 4,713,621 | 12/1987 | Nakamura et al. | 328/72 |
| 4,757,264 | 7/1988 | Lee et al. | 328/137 |
| 4,796,095 | 1/1989 | Shimada | 328/63 |
| 4,820,992 | 4/1989 | Avis | 328/63 |
| 4,949,360 | 8/1990 | Martin | 307/480 |

*Primary Examiner*—Stanley D. Miller
*Assistant Examiner*—Scott A. Ouellette
*Attorney, Agent, or Firm*—Scully, Scott, Murphy & Presser

[57] ABSTRACT

A circuit for synchronizing the phase output of a clock relative to multiple asynchronous input trigger signals. A clock signal is directed as an input to a delay line having spaced output taps to produce a plurality of phase displaced clock signals, which are directed as inputs to a latch circuit. An input trigger signal causes the latch circuit to latch the current states of the phase displaced clock signals, which are directed as inputs to a programmable array logic circuit. Based upon the states of the clock signals, the logic circuit selects the particular clock signal which is synchronized with the input trigger signal, and that particular clock signal is gated as the output clock signal.

8 Claims, 3 Drawing Sheets

PAL. SETUP AND CLOCK CONTROL / SELECTION

| D8 D7 D6 D5 D4 D3 D2 D1 | CLOCK SELECTION EDGE-CTL=0 | EDGE-CTL=1 | EDGE-CTL=0 S2 S1 S0 | EDGE-CTL=1 S2 S1 S0 |
|---|---|---|---|---|
| 1 1 1 1 0 0 0 0 | 16MHZ~ | 16MHZ | 1 0 0 | 0 0 0 |
| 1 1 1 0 0 0 0 0 | DL1~ | DL1 | 1 0 1 | 0 0 1 |
| 1 1 1 1 0 0 0 1 | DL1~ | DL1 | 1 0 1 | 0 0 1 |
| 1 1 1 0 0 0 0 1 | DL1~ | DL1 | 1 0 1 | 0 0 1 |
| 1 1 0 0 0 0 0 1 | DL2~ | DL2 | 1 1 0 | 0 1 0 |
| 1 1 1 0 0 0 1 1 | DL2~ | DL2 | 1 1 0 | 0 1 0 |
| 1 1 0 0 0 0 1 1 | DL2~ | DL2 | 1 1 0 | 0 1 0 |
| 1 0 0 0 0 0 1 1 | DL3~ | DL3 | 1 1 1 | 0 1 1 |
| 1 1 0 0 0 1 1 1 | DL3~ | DL3 | 1 1 1 | 0 1 1 |
| 1 0 0 0 0 1 1 1 | DL3~ | DL3 | 1 1 1 | 0 1 1 |
| 0 0 0 0 0 1 1 1 | 16MHZ | 16MHZ~ | 0 0 0 | 1 0 0 |
| 1 0 0 0 1 1 1 1 | 16MHZ | 16MHZ~ | 0 0 0 | 1 0 0 |
| 0 0 0 0 1 1 1 1 | 16MHZ | 16MHZ~ | 0 0 0 | 1 0 0 |
| 0 0 0 0 1 1 1 0 | DL1 | DL1~ | 0 0 1 | 1 0 1 |
| 0 0 0 1 1 1 1 1 | DL1 | DL1~ | 0 0 1 | 1 0 1 |
| 0 0 0 1 1 1 1 0 | DL1 | DL1~ | 0 0 1 | 1 0 1 |
| 0 0 0 1 1 1 0 0 | DL2 | DL2~ | 0 1 0 | 1 1 0 |
| 0 0 1 1 1 1 1 0 | DL2 | DL2~ | 0 1 0 | 1 1 0 |
| 0 0 1 1 1 1 0 0 | DL2 | DL2~ | 0 1 0 | 1 1 0 |
| 0 0 1 1 1 0 0 0 | DL3 | DL3~ | 0 1 1 | 1 1 1 |
| 0 1 1 1 1 0 0 0 | DL3 | DL3~ | 0 1 1 | 1 1 1 |
| 0 1 1 1 1 0 0 0 | DL3 | DL3~ | 0 1 1 | 1 1 1 |
| 0 1 1 1 0 0 0 0 | 16MHZ~ | 16MHZ | 1 0 0 | 0 0 0 |
| 1 1 1 1 1 0 0 0 | 16MHZ~ | 16MHZ | 1 0 0 | 0 0 0 |
| TOP OF CHART | | | | |

SELECTOR INPUT DEFINITIONS

I0 : 16MHZ
I1 : DL1
I2 : DL2
I3 : DL3
I4 : 16MHZ~
I5 : DL1~
I6 : DL2~
I7 : DL3~

FIG. 3

MULTIPLE EXTERNAL ASYNCHRONOUS TRIGGERS CIRCUIT

BACKGROUND OF THE INVENTION

1. Field of the Invention

The present invention relates generally to a circuit for synchronizing asynchronous input data to a resolution which is greater than that offered by a clock which drives the circuit More particularly, the present invention pertains to a synchronizing circuit as described for asynchronous input data which represent a line of pixels of an image which must be displayed to a resolution which is more precise than that offered by a clock driving the display.

2. Discussion of the Prior Art

One straightforward approach toward improving the resolution of a display is to utilize a higher frequency clock (e.g. 64 MHz or 128 MHz) to drive the display, but that would entail or result in the necessity to use a higher frequency type of logic (e.g. ECL logic at the higher frequency rather than TTL at a 16 MHz frequency). As is known in the electronic arts, a higher frequency clocked circuit is a more expensive approach and also requires more precision in its design.

A second approach toward improving the resolution of a display is to generate a sequence of phase delayed clock signals and then select one optimum particular phase clock signal to achieve synchronization A variety of prior art references take this technical approach, including U.S. Pat. No. 4,713,621, U.S. Pat. No. 4,757,264, and U.S. Pat. No. 4,820,992. These prior art technical approaches often involve rather complex circuits which are expensive to build and implement.

SUMMARY OF THE INVENTION

Accordingly, it is a primary object of the present invention to provide a relatively straightforward and simple technical approach toward synchronizing asynchronous input data with a clock signal.

A further object of the subject invention is the provision of a synchronizing circuit as described which is particularly applicable to a display driven by a synchronized clock signal, particularly a 16 MHz clock signal. In a particular exemplary embodiment, the display is driven by a 16 MHz clock, having a 62.5 nsec time period, which means that without additional compensation, a pixel in the display image can be displayed with a misalignment error of up to 62.5 nsec. In contrast therewith, the exemplary embodiment disclosed and explained herein will display a pixel with a maximum alignment error of up to ±6 nsec.

In accordance with the teachings herein, the present invention provides a circuit for synchronizing the phase output of a clock relative to multiple asynchronous input signals, in which a delay line receives a clock signal as an input and has time delayed output taps to produce a plurality of phase displaced output clock signals. The plurality of phase displaced clock signals are directed as an input to a latch circuit, which is responsive to the receipt of an asynchronous input signal to latch the current states of the plurality of phase displaced clock signals.

A programmable array logic receives as an input the latch states from the latch circuit and compares the latch states to latch states in memory to determine the particular phase displaced clock signal which is selected to achieve synchronization with the asynchronous input signal. A clock selector switch circuit is controlled by the output of the programmable array logic to provide at the output thereof the particular phase displaced clock signal selected to achieve synchronization with the asynchronous input signal.

In accordance with the details of a particular disclosed embodiment, a second delay line receives as an input a complement of the input clock signal, and produces three phase delay complement clock signals, and the first delay line produces three phase delayed outputs of the input clock signal, to produce a total of eight phase displaced clock signals. The clock signal comprises a 16 MHz clock signal, and each output tap of the delay line produces an 8 nsec additional delay. The programmable array logic has in memory twenty four combinations of the states of eight phase displaced clock signals, and produces a three bit binary output signal representative of the particular phase displaced clock signal selected to achieve synchronization. A bistate circuit such as a flip flop receives the multiple asynchronous signals as an input, and changes state in response thereto to cause the latch circuit to latch the states of the plurality of phase displaced clock signals. In the disclosed embodiment, the multiple asynchronous signals represent horizontal line synchronization signals for a display driven by the 16 MHz clock signal.

BRIEF DESCRIPTION OF THE DRAWINGS

The foregoing objects and advantages of the present invention for a multiple external asynchronous triggers circuit may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 3 illustrates the programming of the programmable array logic to enable the proper clock signal to be selected to achieve synchronization.

DETAILED DESCRIPTION OF THE DRAWINGS

Figure 1:
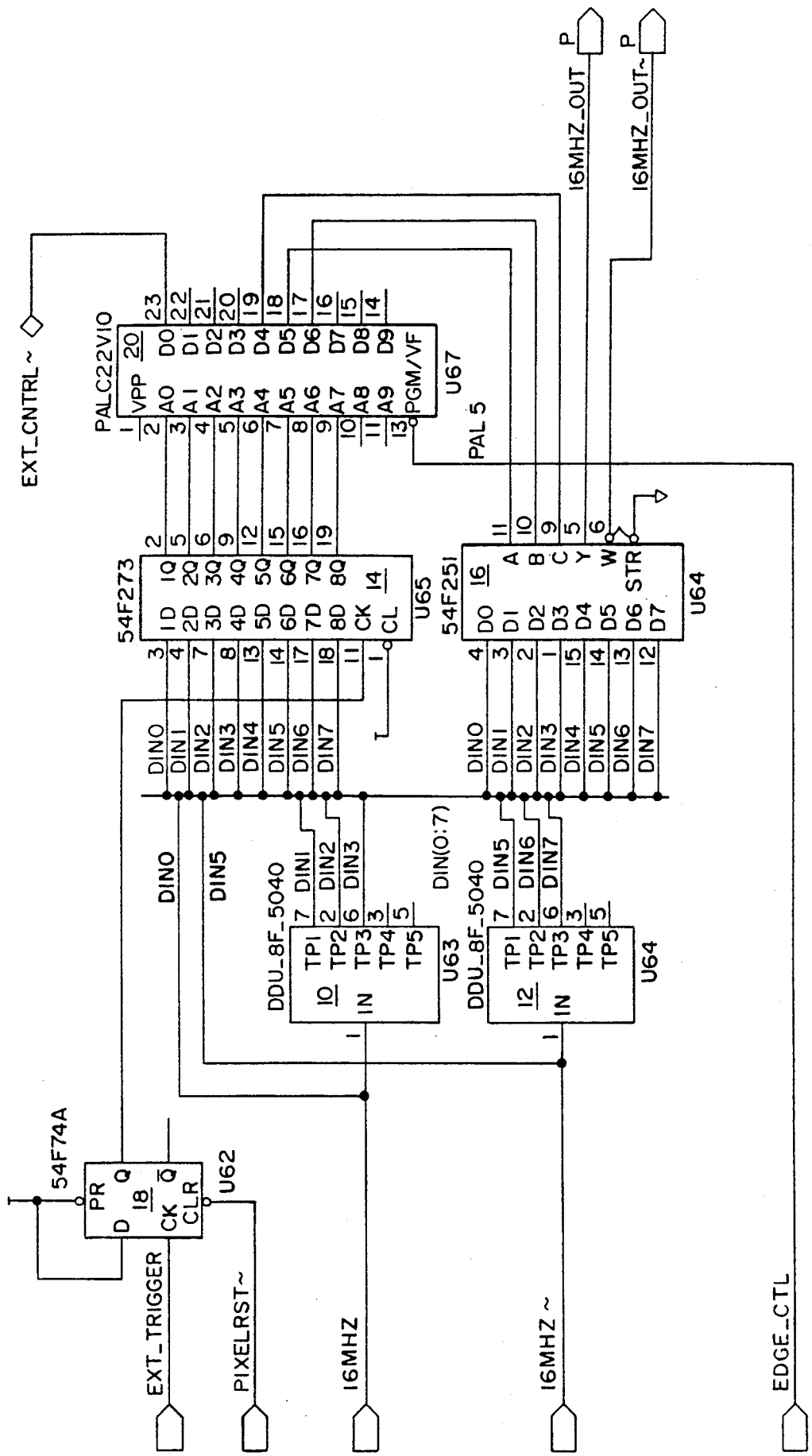
FIG. 1 is an electrical schematic of an exemplary embodiment of a synchronization circuit constructed pursuant to the teachings of the present invention.
Figure 2:
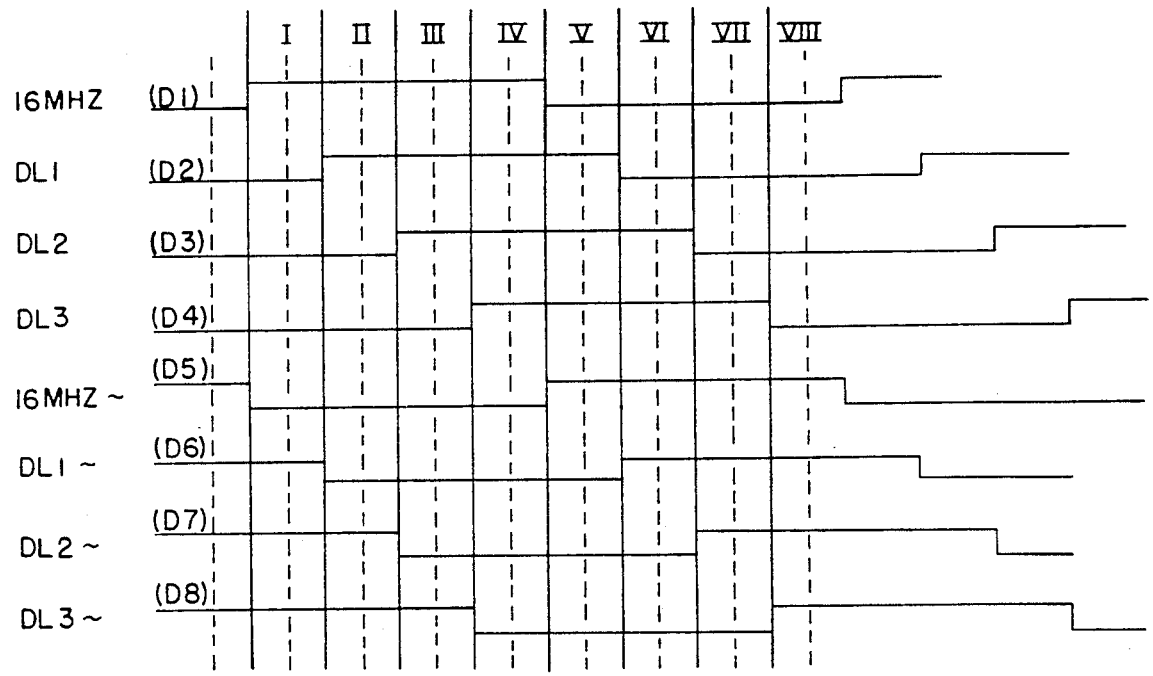
FIG. 2 is a plot of the phase displaced clock waveforms generated in the circuit of FIG. 1. and illustrates the states thereof through eight subperiods of a clock period.

Referring to the drawings in detail, FIG. 1 is an electrical schematic of a circuit constructed pursuant to the teachings of the present invention for synchronizing a 16 MHz clock signal to within ±6 nsec of an asynchronous input trigger or timing signal.

The present invention addresses the general technical area of synchronizing asynchronous input data to a greater resolution than that offered by a clock which drives the circuitry. In a particular embodiment, the asynchronous input data represent synchronization signals for lines of pixels of an image which must be displayed in the image to a finer resolution than that offered by the clock driving the display.

The input data is defined by multiple external asynchronous triggers defining the beginning of each line of pixels of the display, relative to which the phase of an output clock is automatically aligned to within ±6 ns using a 16 MHz square wave clock (Period=62.5 ns) and additional required circuitry.

Referring specifically to FIG. 1, a 16 MHz clock input and the complement thereof are directed as inputs to two active delay lines 10 and 12 having 8 nanosecond delay output taps to produce a set of eight spaced clock pulses (DIN 0 through DIN 7), four for the clock input (DIN 0 through DIN 3) and four for the complement (DIN 4 through DIN 7), which are directed as eight inputs to a latch circuit 14 and a clock input selector circuit 16.

A trigger synchronizing input at the beginning of a line of data triggers a flip flop 18, which produces a one output at Q to the clock input of the latch circuit 14 to cause the states of the eight clock waveforms DIN 0 through DIN 7 to be loaded into the latch circuit 14.

The states of the eight equally spaced 16 MHz clocks at the latch outputs are directed as inputs to a Programmable Array Logic (PAL) chip 20 which receives the latched states of the eight waveforms as inputs thereto at A0 through A7, and is programmed with the logic equations of FIG. 3 to select one of the eight clock waveform inputs to synchronize the input trigger to within the selected alignment of ±6 ns. The PAL chip selects the proper clock waveform of the eight available clock waveforms, and produces a three bit binary output on outputs D4, D5, and D6 to indicate the proper selection to a clock selector circuit 16, which gates on output Y the selected 16 MHz clock output and on output W the complement thereof. The gated clock outputs then drive the display to obtain the desired resolution of ±6 ns.

More precise synchronization could be achieved by equalizing the path delays and/or by providing more than eight equally spaced clocks over the fundamental clock period (16 MHz in this case). It is noted that to obtain the same accuracy (±6 ns), a high frequency clock of at least 83 MHz would be required.

While a preferred embodiments and several variations of the present invention for a multiple external asynchronous triggers circuit are described in detail herein, it should be apparent that the disclosure and teachings of the present invention will suggest many alternative designs to those skilled in the art. For instance, in some embodiments only one clock signal without the complement thereof might be processed in a single active delay line. Moreover, the clock signal could be at any suitable clock frequency.

What is claimed is:

1. A circuit for synchronizing the phase output of a clock relative to multiple asynchronous input signals, comprising:
   a. a delay line means having an input clock signal as an input thereto and having spaced time delayed output taps to produce a plurality of phase displaced output clock signals;
   b. a latch circuit having the plurality of phase displaced clock signals as inputs thereto, and being responsive to an asynchronous input signal to latch the states of the plurality of phase displaced clock signals at the receipt of the asynchronous input signal;
   c. a programmable array logic circuit having the latch states from the latch circuit as inputs there to, and comparing the latch states to latch states in memory to determine the particular phase displaced clock signal which is selected to achieve synchronization with the asynchronous input signal and producing an output signal representative; and
   d. a clock selector switch circuit, controlled by the output signal of said programmable array logic circuit to provide at the output thereof the particular phase displaced clock signal selected to achieve synchronization with the asynchronous input signal.

2. A circuit for synchronizing the phase output of a clock relative to multiple asynchronous input signals as claimed in claim 1, said delay line means comprising a first delay line having a clock signal as an input thereto and a second delay line having a complement of said clock signal as an input thereto, and said first and second delay lines producing a plurality of phase displaced output complement clock signals directed as an input to said latch circuit, and said clock selector switch circuit providing as outputs the particular phase displaced clock signal and the complement of the particular phase displaced clock signal.

3. A circuit for synchronizing the phase output of a clock relative to multiple asynchronous input signals as claimed in claim 2, said first delay line producing three phase delayed outputs of the input clock signal, and said second delay line producing three phase delayed outputs of the complement clock signal, to produce a total of eight phase displaced clock signals.

4. A circuit for synchronizing the phase output of a clock relative to multiple asynchronous input signals as claimed in claim 3, said input clock signal comprising a 16 MHz clock signal, and each output tap of each delay line producing an 8 nsec additional delay.

5. A circuit for synchronizing the phase output of a clock relative to multiple asynchronous input signals as claimed in claim 1, said programmable array logic having in memory twenty-four combinations of the states of eight phase displaced clock signals, and producing a three bit binary output representative of the particular phase displaced clock signal to achieve synchronization.

6. A circuit for synchronizing the phase output of a clock relative to multiple asynchronous input signals as claimed in claim 1, said delay line means producing a total of eight phase displaced clock signals, which are directed as inputs to said latch circuit and said clock selector switch circuit.

7. A circuit for synchronizing the phase output of a clock relative to multiple asynchronous input signals as claimed in claim 1, further comprising a bistate circuit receiving the multiple asynchronous signals as inputs, and changing state in response thereto to cause said latch circuit to latch the states of the plurality of phase displaced clock signals.

8. A circuit for synchronizing the phase output of a clock relative to multiple asynchronous input signals as claimed in claim 7, the multiple asynchronous signals representing horizontal line synchronization signals for a display driven by the particular selected output clock signal, said clock signal comprising a 16 MHz signal, and each output tap of the delay line producing an 8 nsec additional delay.

* * * * *